Figure 1:
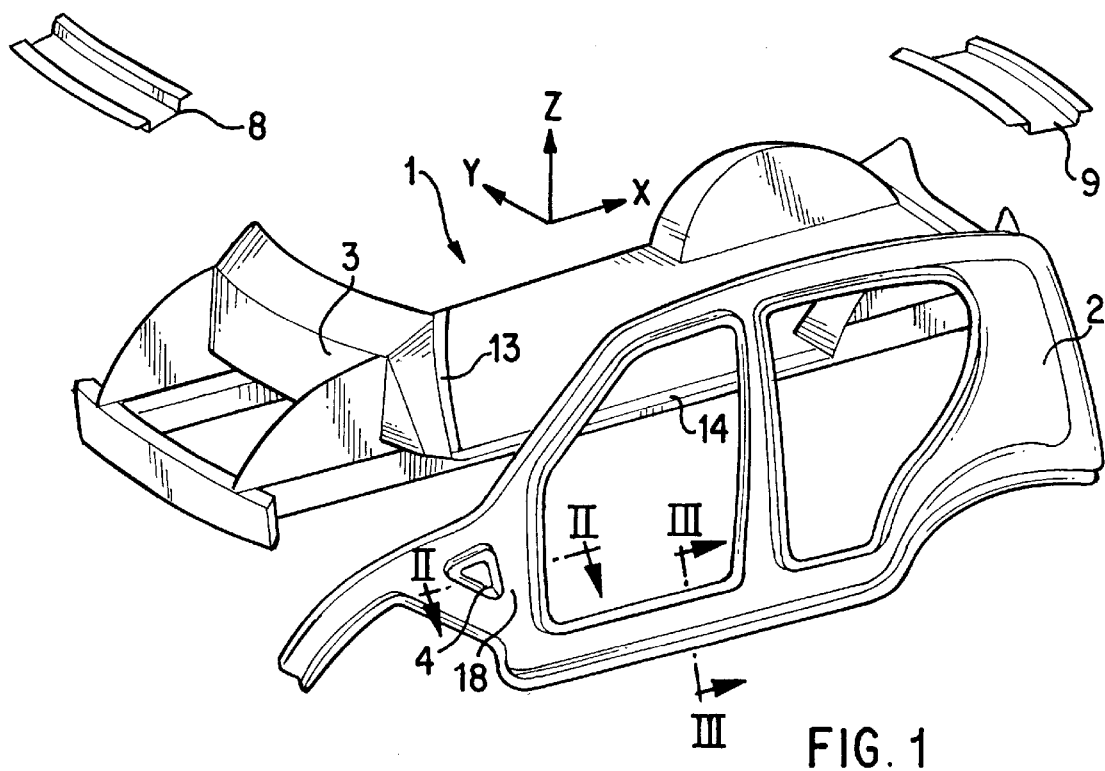

United States Patent [19]
Seefried et al.

[11] Patent Number: 5,860,694
[45] Date of Patent: *Jan. 19, 1999

[54] INTEGRAL BODYSHELL STRUCTURE FOR A MOTOR VEHICLE AND METHOD OF PRODUCING THE BODYSHELL STRUCTURE

[75] Inventors: Johann Seefried, Eutingen; Peter Mack, Rohrau, both of Germany

[*] Notice: This patent issued on a continued prosecution application filed under 37 CFR 1.53(d), and is subject to the twenty year patent term provisions of 35 U.S.C. 154(a)(2).

[73] Assignee: Mercedes-Benz AG, Stuttgart, Germany

[21] Appl. No.: 702,480
[22] PCT Filed: Feb. 28, 1995
[86] PCT No.: PCT/EP95/00728
  § 371 Date: Aug. 29, 1996
  § 102(e) Date: Aug. 29, 1996
[87] PCT Pub. No.: WO95/23724
  PCT Pub. Date: Sep. 8, 1995

[30] Foreign Application Priority Data
  Mar. 1, 1994 [DE] Germany ............ 44 06 615.5

[51] Int. Cl.$^6$ .................................. B62D 25/02
[52] U.S. Cl. ............ 296/203.03; 296/197; 296/29; 29/897.2
[58] Field of Search .................. 296/203, 204, 296/193, 196, 197, 29, 30; 29/897.2

[56] References Cited

U.S. PATENT DOCUMENTS

| | | | |
|---|---|---|---|
| 2,035,800 | 3/1936 | Drauz | 296/209 |
| 2,216,120 | 10/1940 | Ledwinka | 296/203 |
| 4,900,083 | 2/1990 | Kumasaka et al. | 296/203 X |
| 5,201,566 | 4/1993 | Mori | 296/192 |
| 5,209,541 | 5/1993 | Janotik | 296/203 |
| 5,213,386 | 5/1993 | Janotim et al. | 296/29 |
| 5,246,264 | 9/1993 | Yoshii | 296/203 |
| 5,619,784 | 4/1997 | Nishimoto et al. | 296/204 |

FOREIGN PATENT DOCUMENTS

| | | | |
|---|---|---|---|
| 2643034 | 8/1990 | France | 296/197 |
| 1 167 667 | 4/1964 | Germany | |
| 27 12 084 | 9/1978 | Germany | |
| 4313562 | 10/1994 | Germany | 296/203 |
| 124574 | 7/1985 | Japan | 296/203 |
| 4133871 | 5/1992 | Japan | 296/203 |
| 4185586 | 7/1992 | Japan | 296/193 |
| 6056053 | 3/1994 | Japan | 296/193 |
| 498 671 | 1/1939 | United Kingdom | |
| 925 460 | 5/1963 | United Kingdom | |

*Primary Examiner*—Dennis H. Pedder
*Attorney, Agent, or Firm*—Evenson, McKeown, Edwards & Lenahan, P.L.L.C.

[57] ABSTRACT

Integral bodyshell structure for a motor vehicle and method for its production. Known vehicle bodyshell structures are composed of a multiplicity of individual sheet-metal stampings, and as a result complex joining processes for the sheet-metal shell construction arise. In the invention, first the inner side-wall part is joined on each side to the under-frame assembly and then the outer side-wall parts are added. This method has applications for the production of passenger cars.

11 Claims, 2 Drawing Sheets

INTEGRAL BODYSHELL STRUCTURE FOR A MOTOR VEHICLE AND METHOD OF PRODUCING THE BODYSHELL STRUCTURE

The invention relates to an integral bodyshell structure for a motor vehicle, in particular a passenger car, with an underframe assembly, a side-wall assembly which has two side walls, and a roof assembly, and to a method for the production of the bodyshell structure.

Vehicle bodyshell structures of sheet-metal shell construction are known, these being composed of a multiplicity of individual sheet-metal stampings (Mercedes-Benz W 201). In this case, the complete side walls are composed of individual sheet-metal parts of the A-, B- and C- pillars, as well as of the lateral roof frames and sills. These sheet-metal stampings, of which there are a large number, have to be connected to one another in a manner which is relatively complex during assembly of the side wall. For reinforcements in the joint regions and for joint connections to the end supports, for example in the region of the front and rear roof transverse supports, relatively complex guides are required.

It is also known (German Patent 692 243) to construct the side walls of a motor vehicle from a respectively integral, outer and inner side-wall part, which parts are connected to one another. Motor vehicles of this type do not, however, have an integral bodyshell structure.

The object of the invention is to provide an integral bodyshell structure of the type mentioned at the beginning as well as a method for its production, which structure and method ensure that production is of little complexity and that nevertheless the various parts of the bodyshell structure are assembled precisely.

This object is achieved for the integral bodyshell structure in that each side wall is composed of an inner side-wall part and an outer side-wall part which are integrally joined together, and in that, on its two sides facing the inner side-wall parts, the underframe assembly is provided with fastening flanges which are assigned to corresponding fastening regions of the inner side-wall parts in such a manner that the side-wall parts can be aligned in the longitudinal direction of the vehicle relative to the underframe assembly for tolerance-free positioning. This makes it possible, during production of the bodyshell structure, to fit the inner side-wall parts from the sides to the underframe assembly, which has already been finished, and before they are welded to the underframe assembly to align them relative to the underframe assembly in such a manner in the longitudinal direction of the vehicle that each inner side-wall part is positioned precisely on the respective underframe assembly. The alignment of the fastening flanges is selected such that the fitted, inner side-wall part can be displaced on each side of the underframe assembly sufficiently far in the longitudinal direction of the vehicle for precise, tolerance-free positioning relative to the underframe assembly to be achieved. Subsequently placing the outer side-wall parts onto the inner side-wall parts, which have already been positioned precisely and are connected in this position rigidly to the underframe, results in a very precise vehicle body, i.e. a bodyshell structure produced essentially free of tolerances is provided.

In a development of the invention, the fastening flanges are aligned relative to the fastening regions of the side walls in such a manner that it is possible additionally for the side walls to be aligned in a vertical direction relative to the underframe assembly. This makes it possible also to compensate for tolerances in the vertical direction between the underframe assembly and the inner side-wall parts, thus resulting in a further improvement in assembling the bodyshell structure precisely.

For the method for the production of the bodyshell structure, the object according to the invention is achieved in that first the inner side-wall part is joined on each side to the underframe assembly as an integral component, and, as it is joined, fastening in at least one roof transverse support of the roof assembly, and then the outer side-wall parts are added in each case as integral components. By virtue of the method according to the invention the complete, supporting structure of the vehicle body is already provided by the first method or manufacturing step. The subsequent fitting of the outer side-wall parts essentially constitutes merely panelling the already provided supporting structure. The assembly sequence according to the invention means that fewer component parts have to be put in place. An essential advantage of the invention is that complex joining processes for reinforcements and joint-joining connections are dispensed with since all of the joint connections to the joining supports as well as the required reinforcements with the underbody can be realised in a simple manner by virtue of the easy accessibility. These measures result in a reduced manufacturing time, simpler and hence lighter and cheaper reinforcement parts, a reduction in the bodyshell tolerances and thus, inevitably, a reduction in the complexity of production.

In a development of the invention, the outer and inner side-wall parts are each produced from a plate-welded semi-finished product. The outer and inner side-wall parts are each produced as integral components, thereby enabling complex connecting flanges to be dispensed with. This leads to a reduction in the complexity of production and to a reduction in the weight of the bodyshell structure.

In a further development of the invention, the outer and inner side-wall parts are each produced from a sum total of component parts. In this case too, the outer and inner side-wall parts composed of the sum total of component parts are joined together in advance to form integral components which are then fitted to the under-frame in the assembly sequence according to the invention.

In a further development of the invention, reinforcements which are required depending on the type of vehicle are inserted on each side, between the outer and the inner side-wall part. These reinforcements are inserted either in the outer or in the inner side-wall part and the insertion points are easily accessible.

In a further development of the invention, the roof assembly has a roof and at least two roof transverse supports which are inserted between the opposite, inner side-wall parts before the roof is put on. These roof-support parts, which are arranged on the inside, are expediently inserted between the inner side-wall parts at the same time as the inner side-wall parts are being joined to the underframe assembly. As a result, the entire inner supporting body of the passenger cell is produced in one manufacturing step, thus enabling, in a next step, the respectively outer parts of the bodyshell structure to be joined on in a simple manner.

Figure 2:
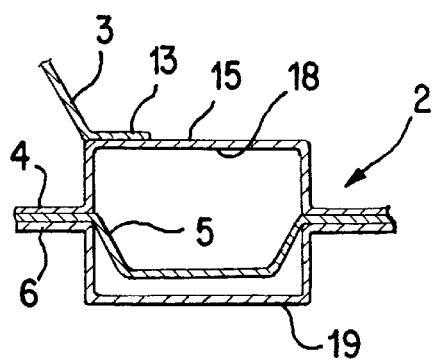
Figure 3:
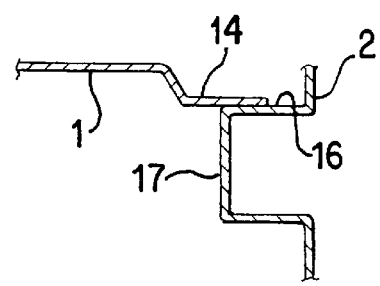
Figure 3A:
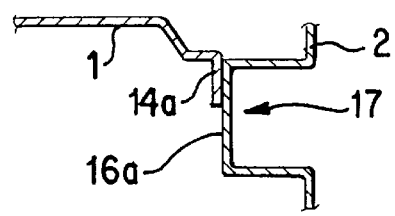
Figure 4:
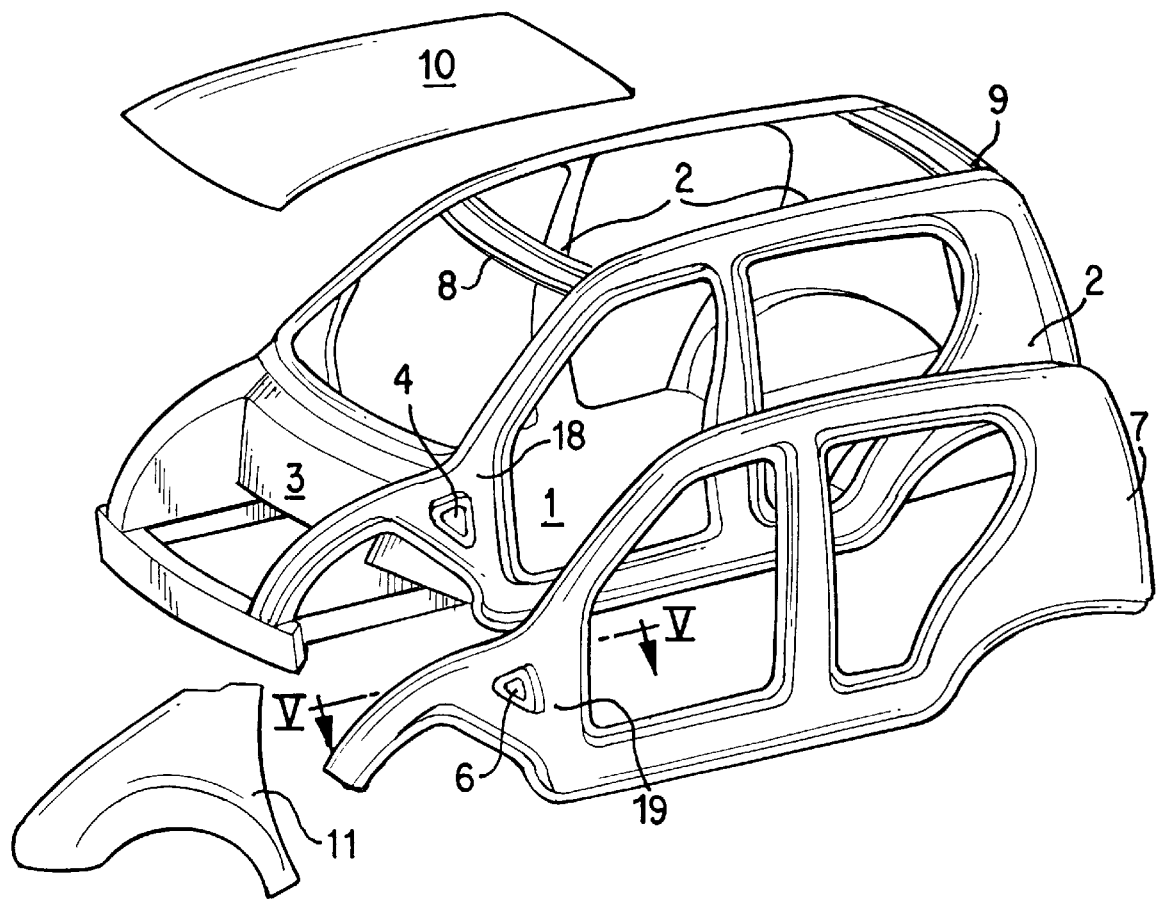
Figure 5:
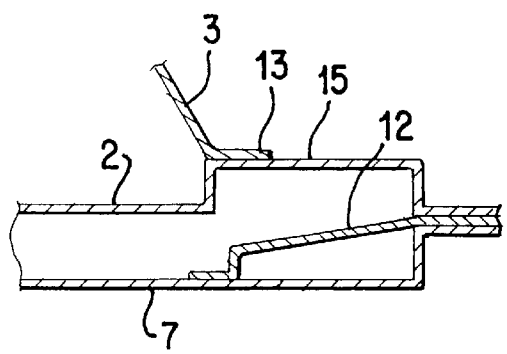

Further advantages and features of the invention emerge from the subclaims and from the description which follows of preferred exemplary embodiments of the invention, which are illustrated with reference to the drawings, in which FIG. 1 shows schematically, in an exploded illustration, the assembly sequence step for producing a bodyshell structure, according to the invention, for a passenger car, in accordance with an embodiment of the method according to the invention in which the inner side-wall parts are joined onto the underframe assembly, FIG. 2 shows a section through the finished bodyshell structure of the passenger car according to FIG. 1, at the level of the intersecting line II—II illustrated in FIG. 1, FIG. 3 shows a section along the intersecting line III—III through the partially completed bodyshell structure according to FIG. 1, in which the inner side-wall part is joined onto the underframe assembly, FIG. 3a shows a sectional illustration corresponding to FIG. 3 through a further bodyshell structure similar to FIG. 1, in which a fastening flange of the underframe assembly, which is intended for the fitting of a corresponding fastening region of the inner side-wall part, is bent downwards, FIG. 4 shows a further exploded illustration of the bodyshell structure of the passenger car according to FIG. 1, in a subsequent assembly sequence step, in which the outer side-wall parts are joined to the inner side-wall parts which have already been connected to the underframe assembly, and FIG. 5 shows a section through the finished bodyshell structure of the passenger car according to FIGS. 1 and 4, at the level of the intersecting line V—V in FIG. 4.

A bodyshell structure for a passenger car has an underframe assembly (1), according to FIGS. 1 and 4. The underframe assembly (1) of the integral bodyshell structure is provided with a front part and subsequent thereto with a scuttle (3). In addition, the bodyshell structure has a left-hand and a right-hand side wall consisting in each case of an inner side-wall part (2) and an outer side-wall part (7). Reinforcements (5, 12), which are specific to the type of vehicle, are inserted on each side between the inner and outer side-wall parts (2, 7) (FIGS. 2 and 5). Each inner and each outer side-wall part (2, 7) can be produced from a plate-welded semi-finished product, it being possible for the semi-finished product that is to be used to be a single-part or multi-part plate, depending on the arrangement of strength. It is also possible for the individual sheet-metal parts, which are essentially known, of the side-wall parts to be joined together by in each case one large sheet-metal part. FIG. 1 only illustrates the inner side-wall part which is on the left in the direction of travel. However, it goes without saying that the right-hand, inner side-wall part (2) is constructed in a correspondingly symmetrical manner and is also joined in the same manner to the underframe assembly (1). The same applies to the left-hand, outer side-wall part (7) illustrated in FIG. 4. The roof assembly of the bodyshell structure consists of a front roof transverse support (8) and a rear roof transverse support (9) as well as of a roof (10).

For the production of the bodyshell structure, the inner side-wall parts (2) are joined on both sides to the underframe assembly (1), after the latter has been finished. In addition, during this assembly sequence step, the front and the rear roof transverse supports (8, 9) are inserted, level with the roof frames of the inner side-wall parts (2), between the opposite, inner- side-wall parts (2). As a result, the entire, supporting body of the bodyshell structure is already obtained with the first assembly sequence step. Panelling, in the form of the outer side-wall parts (7) and the roof (10) of this supporting body, is then carried out in the subsequent, second assembly sequence step.

As can be seen from FIG. 3, each inner side-wall part (2) is joined in such a manner to the underframe assembly (1) that a sill (17) in the form of a U-shaped inwards indentation of a profile of the inner side-wall part (2) is situated on the underbody of the underframe assembly (1). In order to fasten the inner side-wall part (2) to the underframe assembly (1), the underframe assembly (1) is provided on its two opposite sides with fastening flanges (13, 14) (FIGS. 1, 2 and 3), which flanges are aligned in such a manner relative to the corresponding fastening regions (15, 16a) of the inner side-wall part (2) that they allow a certain displacement in the longitudinal direction of the vehicle, i.e. referring to the coordinate system according to FIG. 1, in the X-direction. In this case, the fastening flange (13) is positioned in a vertical longitudinal plane of the vehicle, behind the scuttle in the longitudinal direction of the vehicle. The fastening flange (14) protrudes laterally outwards in a horizontal plane from the underbody. The upper side of the sill (17) forms the corresponding fastening region (16) of the inner side-wall part (2) which, when the inner side-wall part (2) has been fitted, likewise runs horizontally and bears in a sheet-like manner from below against the fastening flange (14). This fastening flange (13) is fitted onto an A-pillar section (18) of the inner side-wall part (2), which section is correspondingly aligned in a vertical longitudinal plane of the vehicle. The A-pillar section (18) provides the inner profile shell of the subsequent A-pillar. The outer profile shell is completed by a corresponding A-pillar section (19) of the outer side-wall part (7). In order to obtain a U-shaped profile for the inner A-pillar section (18) in the joining region of front longitudinal members (which are not shown), there is then provided, towards the front of this section (18), a shaped portion (4) which curves outwards towards the outer side-wall part (7). The outer side-wall part (7) has a corresponding impressed portion (6) by means of which the U-profile, corresponding to the A-pillar section (18), is formed for the outer A-pillar section (19). As can be seen in FIG. 2, this results in the box-shaped cross-section of the A-pillar. To reinforce the A-pillars and the front longitudinal members, reinforcement plates (5, 12) are fastened between the two side-wall parts (2, 7) in the region of the A-pillar sections (18, 19), the reinforcement (12) continuing into the front longitudinal member, as can be seen from FIG. 5. The sheet-like arrangement of the inner side-wall part (2) with its fastening regions (15, 16) on the fastening flanges (13, 14) of the underframe assembly (1) enables the side-wall part (2) to be aligned, before it is welded to the underframe assembly (1), in the longitudinal direction of the vehicle in such a manner that the side-wall part (2) is aligned precisely relative to the corresponding parts of the underframe assembly (1) and is positioned in a tolerance-free manner.

The sectional illustration according to FIG. 3a essentially corresponds to that of FIG. 3. However, in this underframe assembly (1) the fastening flange (14a) is folded downwards, the vertically aligned base of the sill (17) thus producing the relevant fastening region (16a) of the inner side-wall part (2). This enables the inner side-wall part (2), in addition to the displaceability in the longitudinal direction of the vehicle (X-direction), also to be positioned precisely in the vertical direction (Z-direction), additional opportunities to compensate for tolerances before the underframe assembly (1) and the inner side-wall parts (2) are welded together thus being provided. For fastening the inner side-wall part (2) to the underframe assembly (1), the inner side-wall part (2) can therefore first be fitted to the underframe assembly (1) transversely with respect to the longitudinal direction of the vehicle, i.e. in the Y-direction, and can then be precisely aligned either exclusively in the X-direction (FIG. 3) or both in the X-direction and in the Z-direction before it is welded to the underframe assembly (1).

In a next working step of the assembly sequence concept, the outer side-wall parts (7) are then joined to the inner side-wall parts (2) after the corresponding reinforcements (5, 12) have been inserted and positioned between the two side-wall parts corresponding to FIGS. 2 and 5. The roof assembly is completed by putting the roof (10) onto the roof transverse supports (8 and 9) and onto the lateral roof frames of the side walls. In a further assembly sequence step, additional panelling parts are then fitted to the bodyshell structure, to be precise, in particular in the region of the front part mud-guard panelling parts (11) are fitted to the side walls (2, 7).

Instead of inserting reinforcements, it is also possible to leave open specially stressed zones in the main pressed parts of the side walls and to insert the corresponding reinforcements at a later stage.

We claim:

1. A method for producing an integral bodyshell structure for a motor vehicle having an underframe assembly, a side wall assembly having two side-walls each of which is composed of an inner side-wall part and an outer side-wall part, and a roof assembly, the method comprising the steps of:
   first integrally joining the inner side-wall part of each side wall to a respective side of the underframe assembly;
   while performing said integrally joining step, fastening at least one roof transverse support of the roof assembly to the bodyshell structure; and
   adding the outer side-wall part for each side wall to a respective side of the bodyshell structure as an integral component.

2. The method according to claim 1, wherein the outer and inner side-wall parts are each produced from a plate-welded product.

3. The method according to claim 1, wherein the outer and inner side-wall parts are each produced from a sum total of component parts.

4. The method according to claim 1, further comprising the step of inserting reinforcements on each side of the bodyshell structure between the outer and inner side-wall parts.

5. The method according to claim 3, further comprising the step of inserting reinforcements on each side of the bodyshell structure between the outer and inner side-wall parts.

6. The method according to claim 4, wherein said reinforcements are connected to the inner side-wall parts before the outer side-wall parts are joined on the bodyshell structure.

7. The method according to claim 5, wherein said reinforcements are connected to the inner side-wall parts before the outer side-wall parts are joined on the bodyshell structure.

8. The method according to claim 1, wherein said roof assembly includes a roof and at least two roof transverse supports, said at least two roof transverse supports being inserted between opposite, inner side-wall parts on the bodyshell structure before said roof is put on.

9. An integral bodyshell structure for a motor vehicle, comprising:
   an underframe assembly;
   a side-wall assembly having two side walls;
   a roof assembly;
   wherein each of the two side walls is formed of an inner side-wall part and an outer side-wall part, said inner side-wall part having fastening region means for longitudinally aligning said inner side-wall part relative to said underframe assembly by allowing both forward and rearward displacement of said parts relative to one another;
   wherein the underframe assembly has fastening flange means, on its two sides facing said inner side-wall parts, for longitudinally aligning said inner side-wall parts relative to said underframe assembly by allowing both forward and rearward displacement of said parts relative to one another;
   wherein said fastening flange means are assigned to corresponding ones of said fastening region means.

10. The integral bodyshell structure according to claim 9, wherein said fastening flange means are aligned relative to the fastening region means of the inner side-wall parts such that said inner side-wall parts are additionally alignable in a vertical direction relative to the underframe assembly.

11. The integral bodyshell structure according to claim 10, wherein said bodyshell structure is a passenger car bodyshell structure.

* * * * *